United States Patent
Sakai et al.

(10) Patent No.: US 8,837,664 B2
(45) Date of Patent: Sep. 16, 2014

(54) POWER MONITORING SYSTEM

(71) Applicant: Kabushiki Kaishi Toshiba, Tokyo (JP)

(72) Inventors: Hirotaka Sakai, Tokyo (JP); Naotaka Oda, Kanagawa (JP); Tadashi Miyazaki, Kanagawa (JP); Toshifumi Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/062,376

(22) Filed: Oct. 24, 2013

(65) Prior Publication Data

US 2014/0050291 A1     Feb. 20, 2014

Related U.S. Application Data

(62) Division of application No. 12/569,123, filed on Sep. 29, 2009, now abandoned.

(30) Foreign Application Priority Data

Sep. 30, 2008    (JP) ................................ 2008-253187

(51) Int. Cl.
    *G01C 17/00*        (2006.01)
    *G21C 17/108*     (2006.01)
    *G21C 1/04*        (2006.01)

(52) U.S. Cl.
    CPC ................................... *G21C 17/108* (2013.01)
    USPC .......................................... 376/254; 376/354

(58) Field of Classification Search
    CPC ..................................................... G21C 17/108
    USPC ................................................... 376/254, 354
    See application file for complete search history.

(56) References Cited

U.S. PATENT DOCUMENTS

| | | | | |
|---|---|---|---|---|
| 3,612,873 A | * | 10/1971 | Alter | 250/473.1 |
| 4,186,048 A | * | 1/1980 | Thomas | 376/254 |
| 4,607,256 A | * | 8/1986 | Henzel | 340/9.1 |
| 4,772,445 A | * | 9/1988 | Nasrallah et al. | 376/245 |
| 5,089,212 A | * | 2/1992 | Strobel et al. | 376/237 |
| 5,141,710 A | * | 8/1992 | Stirn et al. | 376/254 |
| 5,174,946 A | * | 12/1992 | Watford et al. | 376/216 |
| 2008/0205693 A1 | | 8/2008 | Kitamura et al. | |

FOREIGN PATENT DOCUMENTS

| | | |
|---|---|---|
| CN | 2010-10182745 A | 8/2010 |
| JP | 02-073208 | * 12/1991 |
| JP | 03-274495 A | 12/1991 |
| JP | 2008-209131 A | 9/2008 |

* cited by examiner

*Primary Examiner* — Frank J McGue
(74) *Attorney, Agent, or Firm* — Foley & Lardner LLP

(57) ABSTRACT

The power monitoring system has: a local power range monitor (LPRM) unit that has a plurality of local power channels to obtain local neutron distribution in a nuclear reactor core; an averaged power range monitor (APRM) unit that receives power output signals from the LPRM unit and obtains average output power signal of the reactor core as a whole; and an oscillation power range monitor (OPRM) unit that receives the power output signals from the LPRM unit and monitors power oscillations of the reactor core. The output signals from the LPRM unit to the APRM unit and the output signals from the LPRM unit to the OPRM unit are independent.

7 Claims, 2 Drawing Sheets

POWER MONITORING SYSTEM

CROSS REFERENCE TO RELATED APPLICATION

This application is a divisional of U.S. application Ser. No. 12/569,123,filed Sep. 29, 2009 which is based upon and claims the benefits of priority from the prior Japanese Patent Application No. 2008-253187, filed on Sep. 30, 2008, the entire content of which is incorporated herein by reference.

BACKGROUND OF THE INVENTION

The present invention relates to a power monitoring system (or a power range monitor) of a boiling water reactor and particularly to a power monitoring system that monitors the power oscillations of a nuclear reactor core.

In the boiling water reactor (BWR), the output power alternately falls and rises due to the generation and disappearance of voids, respectively, which may possibly generate power oscillations whereby the output power of the nuclear reactor oscillates and is amplified. The widely known reactor core power oscillation monitoring method is to continue operation as long as the soundness of core fuel is secure even in an operating range in which power oscillations occur, and to detect, when oscillations occur that could lead to events affecting the soundness of the core fuel, the oscillations, and safely stop the operation of the nuclear reactor (See, for example, U.S. Pat. No. 5,174,946,the entire content of which being incorporated herein by reference). Also widely known is a reactivity adjustment method that stabilizes the entire reactor core using the above-described method (See, for example, U.S. Pat. No. 5,141,710,the entire content of which being incorporated herein by reference).

High reliability is required to monitor the power oscillations of the reactor core in terms of securing the soundness of the core fuel. However, the problem with the above-described monitoring of power oscillations is that even though oscillations that could lead to events affecting the soundness of the core fuel can be detected when the oscillations occur, necessary measures may not have been taken to secure the soundness of the fuel.

SUMMARY OF THE INVENTION

The present invention has been made to solve the above-described problems. The objective of the present invention is to provide a power monitoring system that can monitor the power oscillations of the reactor core and establish high reliability in securing the soundness of the core fuel.

In order to achieve the objective, a power monitoring system according to an aspect of the present invention comprises: a local power range monitoring device that has a plurality of local power channels to obtain local neutron distribution in a nuclear reactor core; an averaged power range monitoring device that receives power output signals from the local power range monitoring device and obtains average output power signal of the reactor core as a whole; and an oscillation power range monitoring device including an oscillation power range monitoring mechanism that receives the power output signals from the local power range monitoring device and monitors power oscillations of the reactor core, wherein output signals from the local power range monitoring device to the averaged power range monitoring device and output signals from the local power range monitoring device to the oscillation power range monitoring device are independent.

A power monitoring system according to another aspect of the present invention comprises: a local power range monitoring device that has a plurality of local power channels to obtain local neutron distribution in a nuclear reactor core; an averaged power range monitoring device that receives power output signals from the local power range monitoring device and obtains average output power of the reactor core as a whole; and an oscillation power range monitoring device including an oscillation power range monitoring mechanism that receives the power output signals from the local power range monitoring device and monitors power oscillations of the reactor core, wherein the averaged power range monitoring device transmits output signals from the local power range monitoring device to the oscillation power range monitoring device with the output not passing through an averaged power range monitor processing function in the averaged power range monitoring device.

A power monitoring system according to yet another aspect of the present invention comprises: a local power range monitoring device that has a plurality of local power channels to obtain local neutron distribution in a nuclear reactor core; and an averaged power range monitoring device that receives power output signals from the local power range monitoring device and obtains average output power of the reactor core as a whole, wherein the averaged power range monitoring device includes an averaged power range monitor processing mechanism and an oscillation power range monitoring mechanism, and an input from the local power range monitoring device to the averaged power range monitor processing mechanism is independent of an input from the local power range monitoring device to the oscillation power range monitoring mechanism.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF PRESENT INVENTION

Hereinafter, embodiments of a power monitoring system (a power range monitor) of the present invention will be described with reference to the accompanying drawings.

Figure 1:
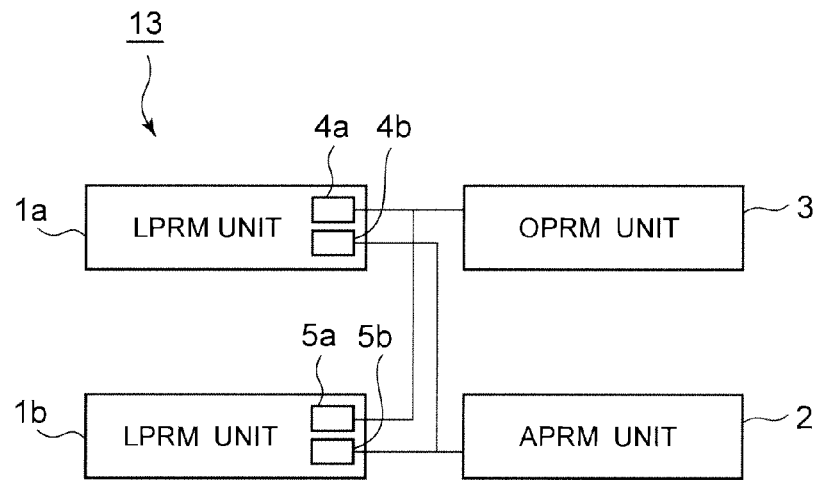
FIG. 1 is a block diagram illustrating the configuration of a power range monitor according to a first embodiment of the present invention.

FIG. 1 is a block diagram illustrating the configuration of a power range monitor according to a first embodiment of the present invention.

As shown in the diagram, a power range monitor (PRM) 13 has: local power range monitor (LPRM) units 1a and 1b, which are a plurality of local power range monitoring devices that obtain the local neutron distribution signals in a nuclear reactor core; an averaged power range monitor (APRM) unit 2, which is an averaged power range monitoring device that receives the power output signals from the LPRM units 1*a* and 1*b* and obtains the average output power of the entire reactor core; and an oscillation power range monitor (OPRM) unit 3, which is an oscillation power range monitoring device that receives the power output signals from the LPRM units 1*a* and 1*b* and monitors the power oscillations of the reactor core.

The inputting of local power signals to the OPRM unit 3 and the inputting of local power signals to the APRM unit 2 are performed by the LPRM units 1*a* and 1*b*, respectively, and are shared.

Incidentally, a process of monitoring the power oscillations of the reactor core inside the OPRM unit 3 is referred to as an OPRM process, and a process of securing the soundness of the core fuel in the APRM unit 2 is referred to as an APRM process.

The transmitting of signals from the LPRM units 1*a* and 1*b* to the OPRM unit 3 is limited to one-way transmission from the LPRM units 1*a* and 1*b* to the OPRM unit 3 via output modules 4*a* and 5*a* of the LPRM units 1*a* and 1*b*.

The transmitting of signals from the LPRM units 1*a* and 1*b* to the APRM unit 2 is limited to one-way transmission from the LPRM units 1*a* and 1*b* to the APRM unit 2 via the output modules 4*b* and 5*b* of the LPRM units 1*a* and 1*b*.

The PRM 13 has a function to transmit channel signals of the LPRM units 1*a* and 1*b* as well as the breakdown or exclusion signals of each channel from the LPRM units 1*a* and 1*b* to the OPRM unit 3.

When a breakdown or exclusion signal of any LPRM channel of the LPRM units 1*a* and 1*b* is generated, the corresponding LPRM channel is excluded in the arithmetic operation in the OPRM unit 3. Moreover, when a breakdown and/or exclusion signal of the LPRM units 1*a* or 1*b* themselves is generated, all the LPRM channels as a whole corresponding to the LPRM unit 1*a* or 1*b* are excluded by the OPRM process.

According to the present embodiment, the outputting of signals from the LPRM units 1*a* and 1*b* to the OPRM unit 3 and the outputting of signals to the APRM unit 2 are limited to a one-way direction and carried out via the different output modules 4*a* and 5*a* and output modules 4*b* and 5*b*. Therefore, the functional independence of the OPRM unit 3 and the APRM unit 2 is sufficiently secured. Thus, the power oscillations of the reactor core can be monitored; high reliability can be established in terms of securing the soundness of the core fuel.

Figure 2:
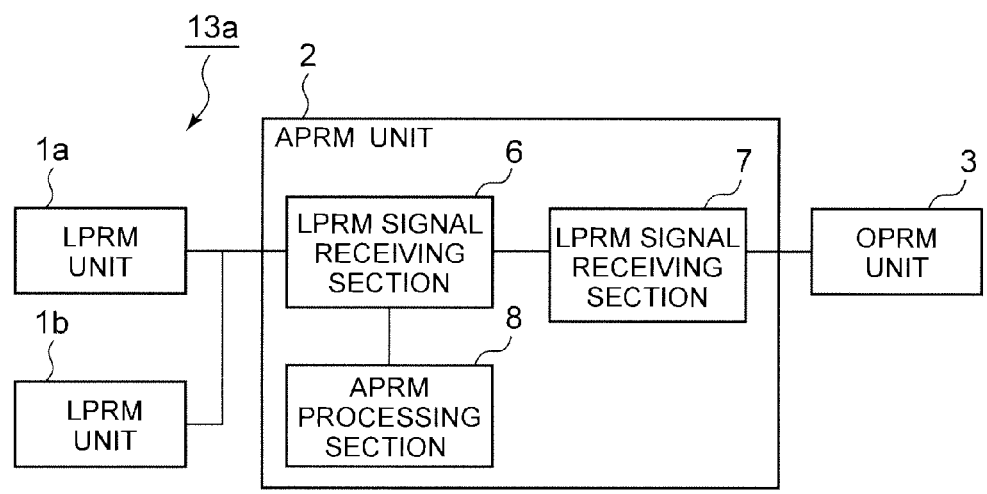
FIG. 2 is a block diagram illustrating the configuration of a power range monitor according to a second embodiment of the present invention.

FIG. 2 is a block diagram illustrating the configuration of a power range monitor according to a second embodiment of the present invention. The portions that are the same as or similar to those of FIG. 1 have been denoted by the same reference numerals to avoid repeating the same description.

As shown in the diagram, a power range monitor (PRM) 13*a* has: LPRM units 1*a* and 1*b*, which are the local power range monitoring devices that obtain the local neutron distribution in a nuclear reactor core; an APRM unit 2, which receives the power output signals from the LPRM units 1*a* and 1*b*, and obtains the average output power of the entire reactor core; and an OPRM unit 3, which receives from the APRM unit 2 the power output signals from the LPRM units 1*a* and 1*b* and monitors the power oscillations of the reactor core.

The inputting of local power signals to the OPRM unit 3 and the inputting of local power signals to the APRM unit 2 are performed by the LPRM units 1*a* and 1*b*, respectively, and are shared.

The OPRM unit 3 and the APRM unit 2 have separate reactor-core monitoring functions, and the function of the OPRM unit 3 is formed independently of the function of the APRM unit 2.

The APRM unit 2 includes: an LPRM signal receiving section 6, which receives LPRM signals; an LPRM signal transmitting section 7, which transmits the LPRM signals to the OPRM unit 3; and an APRM processing section 8, which orders the APRM unit 2 to perform a necessary process.

In the APRM unit 2, once the LPRM signal receiving section 6 receives the LPRM signals from the LPRM units 1*a* and 1*b*, the received signals are transmitted to the LPRM signal transmitting section 7 and the APRM processing section 8. In the OPRM unit 3, the LPRM signals are received through the LPRM signal transmitting section 7 of the APRM unit 2.

Incidentally, the PRM 13*a* has a function to transmit the breakdown or exclusion signals of any of LPRM channels and of the LPRM units 1*a* or 1*b* from the LPRM units 1*a* and 1*b* to the APRM unit 2. Moreover, the signals are designed to be transmitted to the OPRM unit 3.

When a breakdown or exclusion signal of any LPRM channels and of the LPRM units 1*a* and 1*b* is generated, the corresponding LPRM channel is excluded by an arithmetic operation in the OPRM unit 3. Moreover, when a breakdown or exclusion signal of the LPRM unit 1*a* or 1*b* is generated, all the LPRM channels corresponding to the LPRM unit 1*a* or 1*b* are excluded by the OPRM process.

According to the present embodiment, in the OPRM unit 3, the LPRM signals are received via the APRM unit 2. However, the LPRM signals do not pass through the APRM processing section 8 that performs an APRM process when the LPRM signals are transmitted. Therefore, the independence of the OPRM process and APRM process is sufficiently secured. Thus, the power oscillations of the reactor core can be monitored, and high reliability can be established in terms of securing the soundness of the core fuel.

Figure 3:
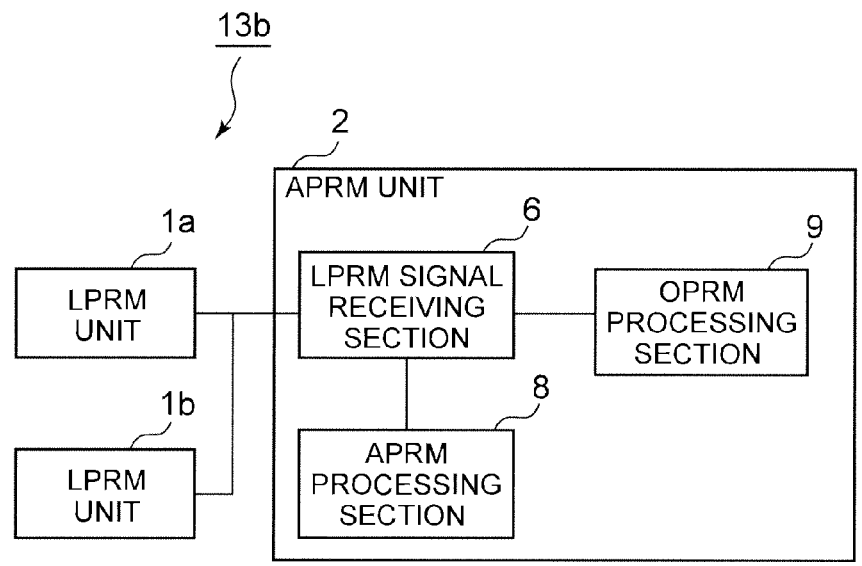
FIG. 3 is a block diagram illustrating the configuration of a power range monitor according to a third embodiment of the present invention.

FIG. 3 is a block diagram illustrating the configuration of a power range monitor according to a third embodiment of the present invention. The portions that are the same as or similar to those of FIG. 1 have been denoted by the same reference numerals to avoid repeating the same description.

As shown in the diagram, a power range monitor (PRM) 13*b* has: LPRM units 1*a* and 1*b*, which are the local power range monitoring devices that obtain the local neutron distribution in a nuclear reactor core; and an APRM unit 2, which receives the power output from the LPRM units 1*a* and 1*b*, and obtains the average output power of the entire reactor core.

The APRM unit 2 includes: an LPRM signal receiving section 6, which receives LPRM signals; an APRM processing section 8, which orders the APRM to perform a necessary process; and an OPRM processing section 9, which orders an OPRM process.

The OPRM processing section 9 and the APRM processing section 8 have separate reactor-core monitoring functions, and the function of the OPRM processing section 9 is formed independently of the function of the APRM processing section 8.

The APRM unit 2 receives signals from the LPRM unit 1*a* and 1*b*.

The inputting of local power signals to the OPRM processing section 9 and the inputting of local power signals to the APRM processing section 8 are performed by the LPRM units 1*a* and 1*b*, and they are shared.

Once the APRM unit 2 receives the LPRM signals from the LPRM units 1*a* and 1*b* by using the LPRM signal receiving section 6, the APRM unit 2 separately transmits the received signals to the APRM processing section 8 and the OPRM processing section 9.

The PRM 13b has a function to transmit the breakdown or exclusion signals of any LPRM channels and of the LPRM units 1a and 1b themselves from the LPRM units 1a and 1b to the APRM unit 2.

When a breakdown or exclusion signal of an LPRM channel of the LPRM units 1a or 1b is generated, the corresponding LPRM channel is excluded by an arithmetic operation in the OPRM processing section 9. Moreover, when a breakdown or exclusion signal of the LPRM unit 1a or 1b is generated, all the LPRM channels corresponding to the LPRM units 1a or 1b are excluded by the OPRM processing section 9.

According to the present embodiment, the OPRM processing section 9 is separated from the APRM processing section 8. Therefore, the independence of the OPRM process and APRM process is sufficiently secured. Thus, the power oscillations of the reactor core can be monitored, and high reliability can be established in terms of securing the soundness of the core fuel.

The following describes an example of an OPRM unit of a power range monitor according to a fourth embodiment of the present invention, with reference to FIG. 1.

In the OPRM unit 3, for example, the following parameters and the like are used as initial setting for monitoring oscillations:

(1) Primary determination amplitude value (peak); (2) Secondary determination amplitude value (trough); (3) Multiplication factor determination value; (4) Trip determination amplitude value; (5) Oscillation interval minimum determination value; and (6) Oscillation interval maximum determination value.

The above values need to be changed according to type of the core fuel and the like. Meanwhile, in terms of securing the soundness of the core fuel, measures to prevent the values from being easily changed are necessary.

Accordingly, in the OPRM unit 3, the variables are set by hardware switches on a board that constitutes part of the OPRM unit 3. That is, in the OPRM unit 3, the variables, which are changed according to type of the core fuel of the nuclear reactor, are formed by a combination of electrical contacts that are so positioned as not to be operated without stopping the oscillation power range monitoring mechanism.

According to the present embodiment, the setting values necessary for the process of monitoring the power oscillations of the reactor core are set by the hardware switches on the board. Therefore, it is difficult to change the setting values during normal operation unless the board is removed, preventing the variables, which are changed according to type of the fuel of the reactor core and the like, from being easily changed. Thus, the power oscillations of the reactor core can be monitored; high reliability can be established in terms of securing the soundness of the core fuel.

The following describes an example of an OPRM unit of a power range monitor according to a fifth embodiment of the present invention, with reference to FIG. 1.

In the OPRM unit 3, parameters, like those described in the fourth embodiment of the present invention, are used as initial setting for performing the process of monitoring the power oscillations of the reactor core. The variables need to be changed according to type of the core fuel and the like. Meanwhile, in terms of securing the soundness of the core fuel, measures to prevent the variables from being easily changed are necessary.

Therefore, in the OPRM unit 3, the variables are set in EEP-ROM mounted on the board that constitutes part of the OPRM unit 3. Moreover, the OPRM unit 3 does not include a circuit that rewrites the EEP-ROM on the board.

That is, the oscillation power range monitoring mechanism is so designed that the variables, which are changed according to type of the core fuel of the nuclear reactor, cannot be changed without stopping the oscillation power range monitoring mechanism, and are stored in an element whose internal state cannot be changed by the operation of the oscillation power range monitoring mechanism.

The EEP-ROM (Electronically Erasable and Programmable Read Only Memory) is a kind of nonvolatile memory and is a semiconductor storage device that can erase or rewrite data by controlling electricity (voltage). Data can be erased from EEP-ROM by applying a higher-than-usual level of voltage. Accordingly, the mechanism of EEP-ROM can be relatively easily realized with no special device. Therefore, the EEP-ROM is used as a programmable element.

According to the present embodiment, the setting values necessary for performing the process of monitoring the power oscillations of the reactor core are set through the EEP-ROM on the board, and there is no circuit that rewrites the EEP-ROM on the board. Therefore, it is difficult to change the setting values during normal operation unless the board is removed, preventing the variables, which are changed according to type of the core fuel and the like, from being easily changed. Thus, the power oscillations of the reactor core can be monitored, and high reliability can be established in terms of securing the soundness of the core fuel.

Figure 4:
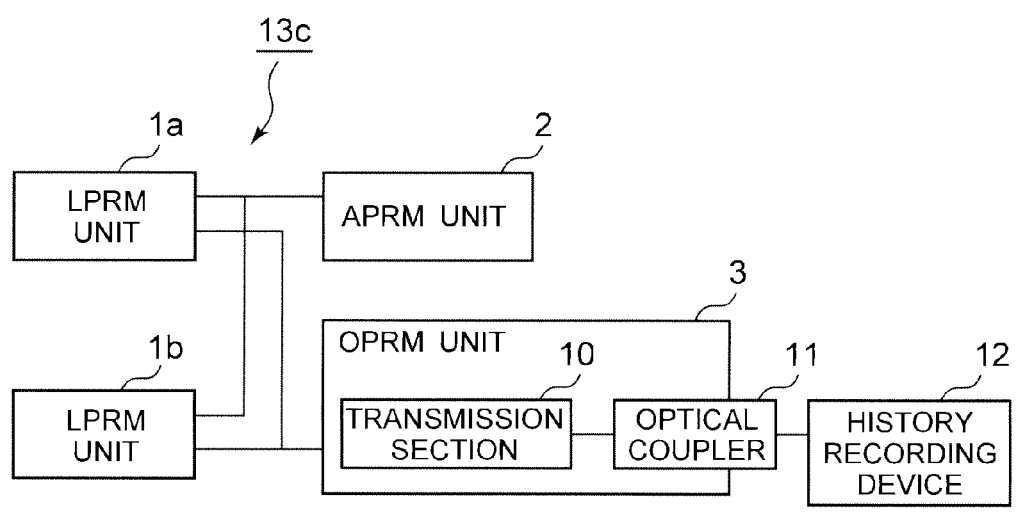
FIG. 4 is a block diagram illustrating the configuration of a power range monitor according to a sixth embodiment of the present invention.

FIG. 4 is a block diagram illustrating the configuration of a power range monitor according to a sixth embodiment of the present invention. The portions that are the same as or similar to those of FIG. 1 have been denoted by the same reference numerals to avoid repeating the same description.

In the OPRM unit 3, the past history needs to be kept for a predetermined period of time. The history function does not directly affect the task of securing the soundness of the core fuel. Therefore, a transmission section 10 is provided in the OPRM unit 3 of a power range monitor 13c and is connected to a history recording device 12. The transmission section 10 has a one-way transmission function to transmit only the output signals not having input signals.

Moreover, regarding a display mechanism (not shown) for monitoring the power oscillations of the reactor core, reliability is similarly required. Therefore, the one-way transmission of only the output signals not having input signals is carried out from the OPRM processing section.

The output to the history recording device 12 is transmitted via an optical coupler 11. Therefore, the history recording device 12 is electrically isolated.

Therefore, even if incompatibility and the like occur in the history recording device 12 and/or the display mechanism, the effect is not transmitted to the OPRM unit 3.

Incidentally, the output signals may be transmitted in a serial or parallel way in the form of digital data. Alternatively, the output signals may be transformed into analog data by converting the signal level into voltage or current values, and then numerical conversion may be performed by the history recording device 12.

In the case of digital transmission, the history recording device 12 may have not only the function to transmit output signals in a one-way direction but a function to confirm if data is normally transmitted by performing parity check to avoid the lack of data. Moreover, the transmission section 10 may have a function to retransmit data in accordance with the normal/abnormal determination result of data transmission from the history recording device 12 that performs parity check and the like.

Incidentally, some measures, including the following ones, need to be taken: checking if the retransmitting function does not affect the process of securing the soundness of the core fuel of the nuclear reactor that the OPRM unit 3 performs; or while data is buffered in the transmission section 10, a measure, such as one that directs other processes of the OPRM unit 3 to the transmission section 10 to one direction, is taken not to affect the previous processes.

The parity check is one of the methods to detect errors in data in data communication. In computers, all data are represented by sequences of binary numbers, i.e. 0 and 1. The parity check is a method to detect errors in data using binary numbers.

Moreover, a determination means (not shown) may be provided to make a determination as to whether the data is normally received, and a determination result transmission means (not shown) may be provided to transmit the determination result of the determination means to the transmission section 10. Furthermore, the transmission of data from another oscillation power range monitoring mechanism (not shown) to the transmission section 10 is limited to the one-way transmission of output signals.

According to the present embodiment, while the recording function of the past history is kept, the OPRM process performed ensures the necessary reliability for securing the soundness of the core fuel. Moreover, the transmission of data from the processing section related to the monitoring of power oscillations of the reactor core to the display mechanism is limited to the one-way transmission by which only the output signals not having input signals are transmitted. Therefore, similar reliability is maintained for the process of monitoring the power oscillations of the reactor core.

The above has described the embodiments of the present invention. The present invention is, however, not limited to the above embodiments. Various modifications may occur by combining the structures of the above embodiments insofar as they are within the scope of the present invention.

What is claimed is:

1. A power monitoring system comprising:
    a plurality of local power range monitoring devices, each of the local power range monitoring devices having a plurality of local power channels to obtain local neutron distribution in a nuclear reactor core;
    an averaged power range monitoring device that receives power output signals from the plurality of the local power range monitoring devices and obtains an average output power signal of the reactor core as a whole; and
    an oscillation power range monitoring device including an oscillation power range monitoring mechanism that receives power output signals from the local power range monitoring devices and monitors power oscillations of the reactor core, wherein
    the output signals from the local power range monitoring devices to the averaged power range monitoring device and the output signals from the local power range monitoring devices to the oscillation power range monitoring device are independent, wherein
    each of the local power range monitoring devices has a function to transmit to the oscillation power range monitoring device, breakdown or exclusion signals of the local power range monitoring device itself and of any of the local power channels connected to the local power range monitoring device,
    when the breakdown or exclusion signal of one or more of the local power channels is generated, the oscillation power range monitoring device excludes only the one or more local power channels corresponding to the breakdown or exclusion signal or signals,
    when the breakdown or exclusion signal of one or more of the local power range monitoring devices is generated, the oscillation power range monitoring device excludes all local power channels corresponding to the one or more local power range monitoring devices, and
    variables that are changed according to a type of fuel of the reactor core are set by hardware switches on a board that comprises part of the oscillation power range monitoring mechanism, the hardware switches comprising a combination of electrical contacts that are positioned such that the variables cannot be changed without stopping the oscillation power range monitoring mechanism.

2. The power monitoring system according to claim 1, wherein,
    the variables that are changed according to the type of fuel of the reactor core are stored in an element whose internal state cannot be changed by operation of the oscillation power range monitoring mechanism.

3. The power monitoring system according to claim 1, wherein
    the oscillation power range monitoring mechanism has a transmission section that transmits output signals not having input signals in a one-way direction, and the transmission section transmits the output signals to a state display section that displays state of power oscillations.

4. The power monitoring system according to claim 1, wherein
    the oscillation power range monitoring mechanism has a transmission section that transmits output signals not having input signals in a one-way direction, and the transmission section transmits the output signals to a history recording device that records a predetermined period of time of past history.

5. The power monitoring system according to claim 4, wherein
    the history recording device includes: a determination means that makes a determination as to whether data is normally received; and a determination result transmission means that transmits a determination result of the determination means to the transmission section, wherein transmission of data from another oscillation power range monitoring mechanism to the transmission section is limited to one-way transmission.

6. The power monitoring system according to claim 4, wherein
    the transmission section and the history recording device are electrically isolated.

7. The power monitoring system according to claim 1, wherein at least one variable that is changed according to the type of fuel of the reactor core is selected from the group consisting of a peak determination amplitude value, a trough determination amplitude value, a multiplication factor determination value, a trip determination amplitude value, an oscillation interval minimum determination value, and an oscillation interval maximum determination value.

* * * * *